US012244991B2

United States Patent
D'Orazio et al.

(10) Patent No.: US 12,244,991 B2
(45) Date of Patent: Mar. 4, 2025

(54) ACOUSTIC MONITORING SYSTEMS AND METHODS

(71) Applicant: BlackBox Biometrics, Inc., Rochester, NY (US)

(72) Inventors: Angela D'Orazio, Rochester, NY (US); David A. Borkholder, Rochester, NY (US); Kim Sherman, Pittsford, NY (US); Scott J. Featherman, Louisburg, NC (US)

(73) Assignee: BlackBox Biometrics, Inc., Rochester, NY (US)

( * ) Notice: Subject to any disclaimer, the term of this patent is extended or adjusted under 35 U.S.C. 154(b) by 148 days.

(21) Appl. No.: 17/912,972

(22) PCT Filed: Mar. 29, 2021

(86) PCT No.: PCT/US2021/024583
§ 371 (c)(1),
(2) Date: Sep. 20, 2022

(87) PCT Pub. No.: WO2021/202337
PCT Pub. Date: Oct. 7, 2021

(65) Prior Publication Data
US 2023/0370758 A1     Nov. 16, 2023

Related U.S. Application Data

(60) Provisional application No. 63/002,149, filed on Mar. 30, 2020.

(51) Int. Cl.
*H04R 1/10*     (2006.01)
*G01H 3/14*     (2006.01)
(Continued)

(52) U.S. Cl.
CPC ......... *H04R 1/1016* (2013.01); *G08B 21/182* (2013.01); *H04R 1/1041* (2013.01)

(58) Field of Classification Search
None
See application file for complete search history.

(56) References Cited

U.S. PATENT DOCUMENTS

| 4,841,571 A | 6/1989 | Kage |
| 6,628,795 B1 | 9/2003 | Ludvigsen |

(Continued)

FOREIGN PATENT DOCUMENTS

| AU | 2021246424 B2 | 2/2024 |
| EP | 4127620 | 2/2023 |

(Continued)

OTHER PUBLICATIONS

"European Application Serial No. 21781449.0, Extended European Search Report mailed Aug. 7, 2023", 8 pgs.

(Continued)

*Primary Examiner* — Qin Zhu
(74) *Attorney, Agent, or Firm* — Schwegman Lundberg & Woessner, P.A.

(57) ABSTRACT

Systems and methods to provide acoustic monitoring are disclosed, comprising receiving a first acoustic signal and providing a first analog signal output representative of the received first acoustic signal using a first sensor, determining at least one of a continuous noise level of the first analog signal output of the first sensor or a peak level of impulse noise of the first analog signal output of the first sensor using analog signal processing circuitry, and sampling, using digital signal processing circuitry, at least one of the determined continuous noise level of the first analog signal output or the peak level of impulse noise of the first analog signal (Continued)

output from the analog signal processing circuitry to provide data privacy of the first analog signal output.

20 Claims, 6 Drawing Sheets

(51) Int. Cl.
*G08B 21/18* (2006.01)
*H04R 29/00* (2006.01)

(56) References Cited

U.S. PATENT DOCUMENTS

| | | | |
|---|---|---|---|
| 8,712,066 | B1 | 4/2014 | Baker et al. |
| 10,141,003 | B2 | 11/2018 | Ma et al. |
| 2013/0056295 | A1 | 3/2013 | Campbell et al. |
| 2015/0010158 | A1* | 1/2015 | Broadley ............... A61F 11/14 381/58 |
| 2017/0312135 | A1 | 11/2017 | Parkins |
| 2018/0140233 | A1 | 5/2018 | Lacirignola et al. |
| 2018/0220239 | A1* | 8/2018 | Keady ................... H04R 9/027 |
| 2018/0301011 | A1 | 10/2018 | Werner et al. |
| 2019/0201244 | A1* | 7/2019 | Parkins ................. A61F 11/08 |
| 2019/0278556 | A1* | 9/2019 | Usher .................. G06F 3/04842 |
| 2021/0236339 | A1* | 8/2021 | Bonnet ................. H04R 29/00 |
| 2022/0141571 | A1* | 5/2022 | Kara ...................... A61F 11/14 381/72 |
| 2023/0035275 | A1* | 2/2023 | Voix ................ G10K 11/17854 |

FOREIGN PATENT DOCUMENTS

| | | |
|---|---|---|
| WO | 2005008194 | 1/2005 |
| WO | 2018093444 | 5/2018 |
| WO | WO-2021202337 A1 | 10/2021 |

OTHER PUBLICATIONS

"Australian Application Serial No. 2021246424, First Examination Report mailed Sep. 8, 2023", 3 pgs.
"International Application Serial No. PCT/US2021/024583, International Search Report mailed Jun. 14, 2021", 3 pgs.
"International Application Serial No. PCT/US2021/024583, Written Opinion mailed Jun. 14, 2021", 9 pgs.
"Australian Application Serial No. 2021246424, Subsequent Examiners Report mailed Nov. 30, 2023", 3 pgs.
"Australian Application Serial No. 2021246424, Response filed Jan. 16, 2024 to Subsequent Examiners Report mailed Nov. 30, 2023", 9 pgs.
"European Application Serial No. 21781449.0, Response filed Jan. 25, 2024 to Extended European Search Report mailed Aug. 7, 2023", 32 pgs.
"Canadian Application Serial No. 3, 173,948, Examiners Rule 86(2) Report mailed Mar. 1, 2024", 5 pgs.
"Canadian Application Serial No. 3,173,948, Response filed Jun. 19, 2024 to Examiners Rule 86(2) Report mailed Mar. 1, 2024", 13 pgs.

* cited by examiner

ACOUSTIC MONITORING SYSTEMS AND METHODS

CLAIM OF PRIORITY

This application is a U.S. National Stage Filing under 35 U.S.C. 371 from International Patent Application Serial No. PCT/US2021/024583, filed Mar. 29, 2021, which application claims the benefit of priority under 35 U.S.C. § 119 (e) of U.S. Provisional Patent Application Ser. No. 63/002,149, filed on Mar. 30, 2020, both of which are herein incorporated by reference in entireties.

BACKGROUND

Unwanted or excessive sound can have deleterious effects on human health. Sounds having sound pressure levels (SPLs) above 85 decibels (dB) for extended periods of time can damage structures of the inner ear, leading to hearing loss. In addition, exposure to impulse events, such as blast exposure, often referred to as blast overpressure (BOP), can pose both a risk of noise-induced hearing loss (NIHL) and a risk of traumatic brain injury (TBI). Impulse events also include impulse noise events, such as gunshots, explosions, or other sound events having fast initial rise times, such as of 50 µs or less (e.g., frequencies of 20 kHz or higher) often with SPLs above 140 dB (depending on distance from the event).

NIHL is the most prevalent service-related disability for US veterans, with VA-related expenditures exceeding $1 b USD annually. Hearing protection devices (HPDs) provide some protection from noise exposure, but suffer intrinsic limitations, such as noise levels exceeding protective capabilities, bone conduction through the skull bypassing the HPD, operational requirements for long exposure periods or communication requirements, compliance issues, improper fit, or unexpected exposure to events when the HPD is not worn.

There is a need to monitor human exposure to excessive acoustic and impulse events using stationary sensors configured to monitor acoustic or impulse events from stationary locations and portable, ambulatory sensors configured to be attached to or incorporated in equipment or worn by a subject. Additionally, there is a need to address data privacy issues with respect to potentially sensitive information sensed or detected from such sensors.

SUMMARY

Systems and methods to provide acoustic monitoring with data privacy are disclosed. A first sensor, such as an analog acoustic sensor, can receive a first acoustic signal and provide a first analog signal output representative of the received first acoustic signal. Analog signal processing circuitry (e.g., consisting of operational amplifiers (op-amps), capacitors, or other analog circuits unsupported by a memory circuit, etc.) can determine one or more analog signal measures, such as at least one of a continuous noise level of the first analog signal output of the first sensor with respect to a time period or a peak level of impulse noise of the first analog signal output of the first sensor with respect to the time period. Digital signal processing circuitry (e.g., an analog-to-digital converter (ADC), controller circuitry, a memory circuit, etc.) can sample one or more of the determined analog signal measures, such as at least one of the determined continuous noise level of the first analog signal output or the peak level of impulse noise of the first analog signal output, to provide data privacy of the first analog signal output from the first sensor. In certain examples, the digital signal processing circuitry can sample at a sampling frequency too low to reproduce a vocal audio signal.

In an example, continuous and impulse noise dosimetry can be provided in a hearing protection device, such as an earplug. The hearing protection device can include a proximal portion configured for placement in an ear canal of a subject to at least partially reduce exposure of an inner ear of the subject to external noise, the proximal portion comprising a first opening at a first end and an air duct and a first sensor having a sound port open to or aligned with the air duct. The hearing protection device can further include a distal portion configured to be located outside of the ear canal of the subject, the distal portion comprising a second opening on a second end opposite the first end, a second sensor having a sound port open to or aligned with the second opening, and electronic circuitry to support the first and second sensors, and an isolating structure configured to couple the distal portion to the proximal portion.

In an example, the portion can include a third opening on the second end and a third sensor having a sound port open to or aligned with the third opening. The first sensor can be configured to measure continuous noise internal to the air duct of the proximal portion and, when the hearing protection device is placed in the ear canal of the subject, continuous noise internal to the ear canal or the inner ear of the subject. The second and third sensors can be configured to measure continuous and impulse noise external to the hearing protection device. The second sensor can be configured to measure sound pressure levels up to an upper limit of the second sensor, and the third sensor can be configured to measure sound pressure levels above the upper limit of the second sensor.

This summary is intended to provide an overview of subject matter of the present patent application. It is not intended to provide an exclusive or exhaustive explanation of the disclosure. The detailed description is included to provide further information about the present patent application. Other aspects of the disclosure will be apparent to persons skilled in the art upon reading and understanding the following detailed description and viewing the drawings that form a part thereof, each of which are not to be taken in a limiting sense.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
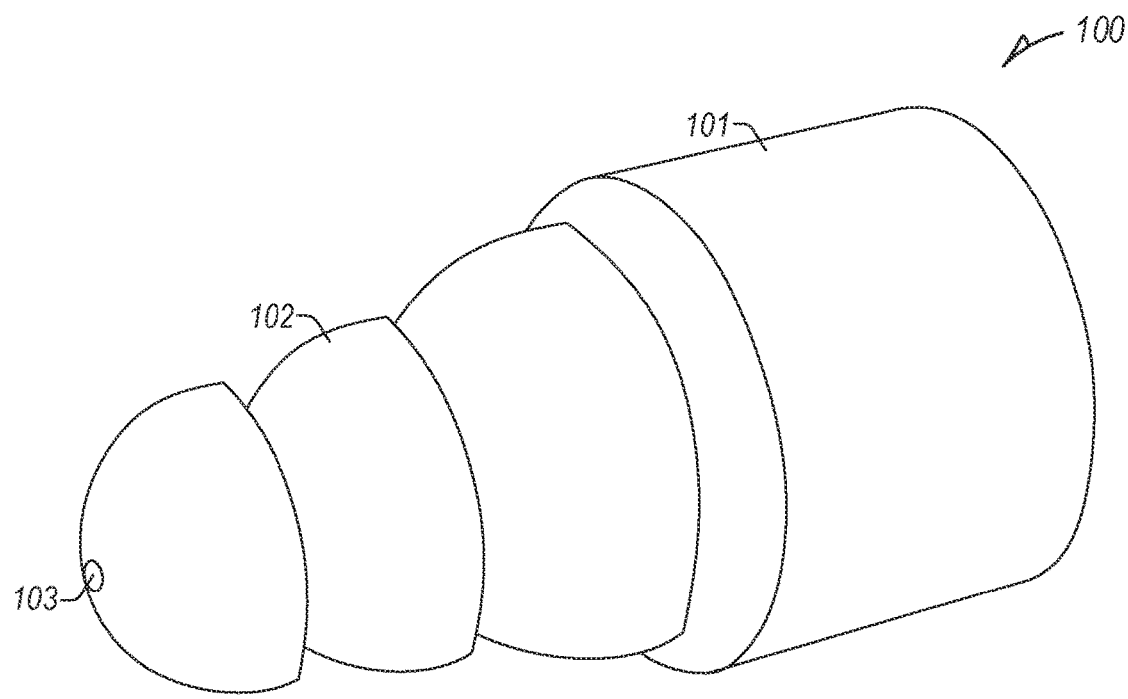
FIGS. 1-2 illustrate example wireless earplug structures including fully integrated sensors and support electronics for continuous and impulse noise monitoring.

Certain subject populations, such as warfighters, are required to wear hearing protection while operating in noisy environments, Extensive use of in-ear hearing protection for warfighters on the battlefield as well as in training provides a unique platform for data collection to improve understanding of factors impacting each subject. The present inventors have recognized, among other things, a platform to measure noise exposure internal to hearing protection (e.g., at-ear exposure), such as within an ear of a subject wearing in-ear hearing protection or internal to over-ear or other hearing protection, to evaluate the effectiveness of such hearing protection, and to provide personalized dose information and real-time feedback to the subject or one or more other persons or systems monitoring the subject, such as to mitigate unnecessary risk of NULL or one or more other negative exposure-related outcomes.

Existing noise dosimeters, such as handheld noise dosimeters, can be problematic for several reasons. In practice, handheld noise dosimeters often do not provide precise measurement of a subject's ambient noise exposure over time, which may leave subjects under-protected. Personal noise dosimeters worn on the shoulder, around the neck, or outside of the ear attempt to remedy such defect, but are often cumbersome to wear, and cannot determine the effectiveness of in-ear, over-ear, or other hearing protection. In-ear noise dosimeters continue to evolve with various design challenges, such as the location of electronics (e.g., wired in-ear noise dosimeters), sound isolation, and the monitoring of such sound isolation while also accurately monitoring a subject's exposure to noise or impulse events.

The present inventors have recognized a noise dosimeter system and method, integrating an HPD-style earplug with sensors for measuring sound inside of the ear canal of a subject and, separately, on the exterior of the earplug for environmental monitoring, including accurately monitoring and recording the subject's exposure to noise and impulse events. Data capture, signal processing, dose calculation, and storage can be integrated into each earplug. The earplugs can further include a wireless communication interface to transmit data to devices, such as mobile Android™ devices, for long term data storage. In certain examples, the devices can alert the subject to unsafe levels, including acute or aggregate noise or impulse events, or aggregate levels exceeding any daily or weekly exposure limits under OSHA 1910.95, MIL-STD-1474E, etc.

The noise dosimeter disclosed herein can provide wireless continuous and/or impulse noise dosimetry in a hearing protection device, such as an earplug, that does not impact the noise reduction rating of the hearing protection device, such as by providing any additional sound pathway into an ear canal of a subject. Further, each earplug can include physical elements configured to mitigate false readings from mechanical contact to the earplugs through one or more of the sensors, such as detecting physical shock to the earplug using an accelerometer, etc. For example, an interior sensor can include a vibration dampener to isolate physical shock from the earplug. Electronic components of the dosimeter, such as a battery, communication interface, etc., can be isolated from one or more of the sensors, such as the interior sensor, by an isolating structure, including a suspension-like element configured to further attenuate physical shock to an outer portion of the earplug, etc.

In addition, the present inventors have recognized systems and methods to provide data privacy of acoustic monitoring by determining one or more relevant signal measures of an analog audio signal using analog processing circuitry, such as one or more analog circuits (e.g., an analog peak and hold circuit, an analog integrator, etc.) and providing such analog signal measures to digital signal processing circuitry, effectively isolating vocal audio components from digital signal processing and storage without reducing signal integrity of the received analog audio signal. Such data privacy aspects, the combination of analog and digital signal processing circuitry, are applicable to in-ear, over-ear, or other hearing protection devices, and further can be used to validate or determine efficacy or compliance of such hearing protection devices.

Figure 2:
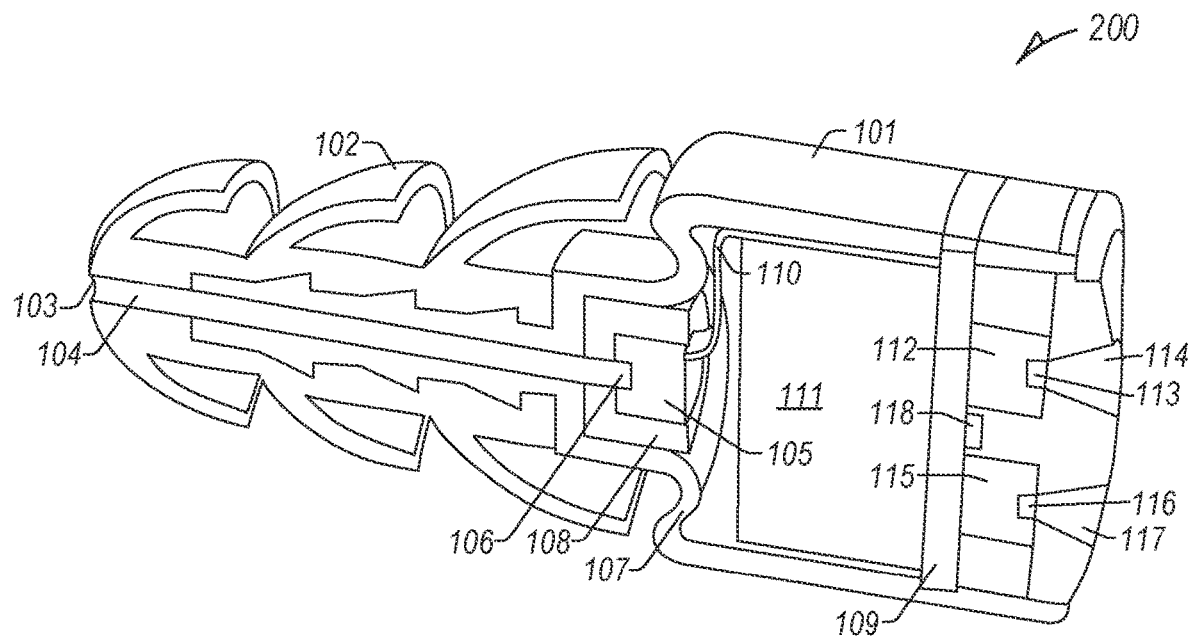

FIGS. 1-2 illustrate example wireless earplug structures 100, 200 including a housing 101, an earplug 102, and fully integrated sensors and support electronics for noise monitoring. In an example, the wireless earplug structures 100, 200 can include left and right earplugs structures having multiple integrated sensors for binaural dosimetry. The wireless earplug structures 100, 200 can include a proximal portion configured for placement in an ear canal of the subject to at least partially reduce exposure of an inner ear of the subject to external noise, and a distal portion configured to be located outside of the ear canal of the subject. The multiple sensors can include an internal sensor, such as a first sensor 105, and one or more external sensors, such as second or third sensors 112, 115, The multiple sensors can include a microphone (MIC) or one or more other acoustic transducers configured to convert a received acoustic signal (e.g., pressure waves, such as acoustic pressure waves, impulse or blast pressure waves, etc.) into an electrical output signal representative of the received acoustic signal.

In an example, the first sensor 105 can be an interior sensor (e.g., an interior microphone) located within the earplug structure 100 having a sound port 106 open or proximate to an air duct 104 in the earplug 102. The air duct 104 can open to a vent 103 in the earplug 102 facing or open to a proximal, inner ear portion of the earplug 102 to monitor noise intensity bypassing the hearing protection structure of the earplug 102 at an inner portion of a subjects ear when in use. The first sensor 105 can receive and measure one or both of continuous noise and peak levels of impulse noise reaching the ear canal up to, for example, an upper limit of the sensor, such as 140 dB SPL.

One or more exterior sensors can be located proximate a distal, outer portion of the housing 101 to monitor external exposure of the subject, such as one or more of second and third sensors 112, 115. The second sensor 112 (e.g., an exterior COTS microphone) can include a sound port 113 proximate an opening 114 in the housing 101. The second sensor 112 can be configured to measure continuous noise levels external to the hearing protection structure of the earplug 102 up to, for example, an upper limit of the second sensor 112, such as 140 dB SPL. In certain examples, depending on the type or components of the second sensor 112, the upper limit can be higher or lower.

The third sensor 115 can have a different dynamic range than the first and second sensors 105, 112. In an example, the third sensor 115 (e.g., a B3 microphone) can include a sound port 116 proximate an opening 117 in the housing 101. The third sensor 115 can include an attenuated sensor (e.g., a microphone having attenuation material covering the sound port 116 of the microphone, etc.) configured to measure impulse noise with peaks above the upper limit of the second sensor 112, such as from 140-170 dB SPL, etc. In an example, the third sensor 115 can include a vocal acoustic attenuation sensor or system, such as described in the commonly assigned U.S. Application Ser. No. 62/975,399, "VOCAL ACOUSTIC ATTENUATION", filed Feb. 12, 2020, or PCT Application No. PCT/US2021/017673, "VOCAL ACOUSTIC ATTENUATION", filed Feb. 11, 2021, each of which are incorporated by reference herein in their entireties. In other examples, the third sensor 115 can include one or more other attenuated sensors, with or without one or more of the sound port 116 or opening 117.

In certain examples, the wireless earplug structures 100, 200 can include the first, second, and third sensors 105, 112, 115 for one or both of a set of earplug structures. In other examples, the wireless earplug structures 100, 200 can include the first sensor 105 and one of the second or third sensors 112, 115 for one or both of a set of earplugs, or, to reduce costs while providing system-level efficacy, the first sensor 105 and one of the second or third sensors 112, 115 in one of a set of earplugs and the first sensor 105 and the other of the second or third sensors 112, 115 in the other of the set of earplugs.

In certain examples, the wireless earplug systems 100, 200 can monitor for one or both of continuous and impulse noise regulated under MIL-STD-1474E, and can provide various information on effectiveness of the hearing protection structure as worn by the subject, such as proper use, insertion, functionality, or protective capabilities of the hearing protection structure of the earplug 102, etc.

In the examples of FIGS. 1-2, electronics of the wireless earplug structures 100, 200 can be positioned about the distal, outer portion of the housing 101 to ensure that the wireless earplug system 100, 200 can be worn safely and effectively. In this example, a battery 111 and supporting electronics (e.g., on a printed circuit board (PCB) 109) can be positioned in the housing 101, isolated from the hearing protection structure of the earplug 102 by an isolating structure 107 and flex cable 111. The isolating structure 107 can include a flexible suspension configured to help isolate the first sensor 105 from shocks to the distal portion of the wireless earplug structure 100, 200 or the housing 101. In an example, the isolating structure 107 can include a flexible, vinyl s-shaped isolating structure, with an air gap between the first sensor 105 and the battery 111. The flexible cable 110 can enable electrical communication to the PCB 109 and a communication circuit 118 (e.g., Bluetooth Module) located at the distal portion of the housing 101 with respect to the hearing protection structure of the earplug 102.

In an example, the first sensor 105 can further be isolated from the housing 101 by a vibration dampener material 108. The first sensor 105 can be at least partially surrounded by the vibration dampener material 108. FIG. 2 illustrates the vibration dampener material 108 surrounding all faces but the distal face of the first sensor 105 proximate the battery 111. In other examples, the vibration dampener material 108 can surround the distal face of the first sensor 105 as well, only exposing the flexible cable 110 between the first sensor 105 and the remaining electronics of the wireless earplug system 100, 200. In certain examples, the vibration dampener material 108 can be made of the same material as the material of the earplug 102 (e.g., foam, silicone, elastomeric polymer, etc.), or in other examples, an alternative attenuation material.

In other examples, one or more features of the wireless earplug structure 100, 200, such as the isolating structure 107, the hearing protection structure of the earplug 102, etc., can made with a miniaturized, layered construction to improve the sound dampening. The layered construction can include a material, an airgap standoff, then additional material, similar to acoustic wall design.

Figure 3:
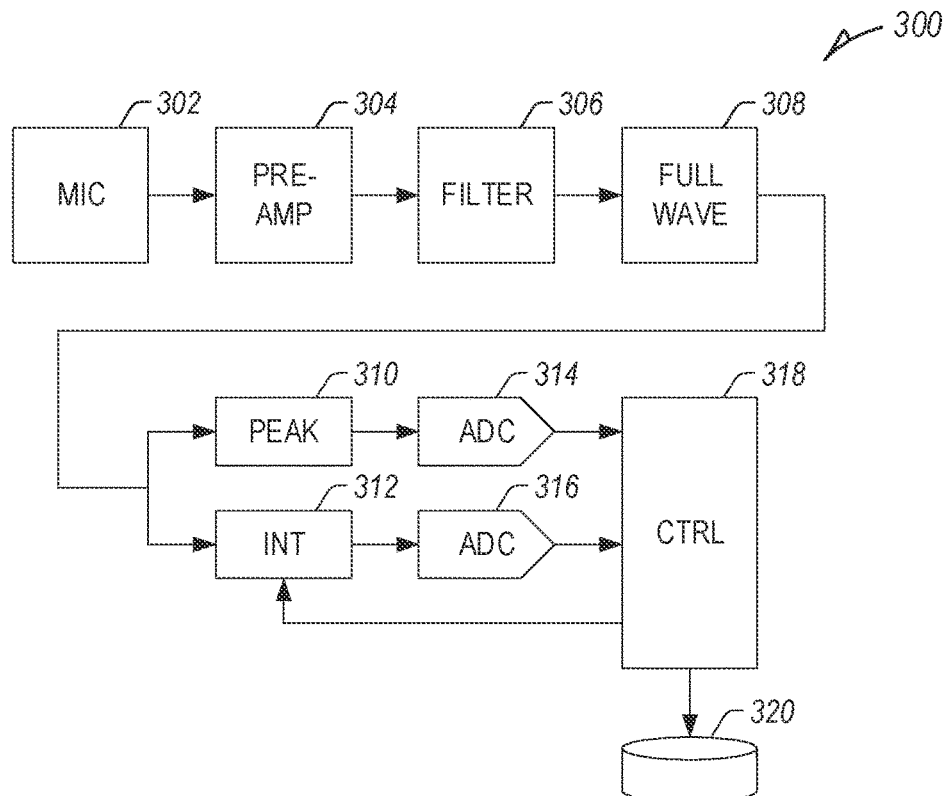
FIG. 3 illustrates an example signal processing system including analog and digital processing circuitry.

FIG. 3 illustrates an example signal processing system 300 for a sensor, such as one or more of the first, second, or third sensors 105, 112, 115 illustrated in FIGS. 1-2, including analog and digital processing circuitry. The analog processing circuitry can be configured to process an output of a sensor configured to produce an analog output signal, such as an analog microphone 302, into one or more measurements, such as a peak measurement, a cumulative measurement, etc. The digital processing circuitry can be configured to sample the one or more measurements, such as using an analog-to-digital controller (ADC), etc., to provide exposure information to a subject.

The example signal processing system 300, in addition to the analog microphone 302 (or other sensor), an amplifier circuit (Pre-Amp) 304 and a filter circuit 306 (e.g., an A-weighted filter or one or more other filter circuits) to amplify and filter the output of the analog microphone 302 (or other sensor). A full-wave rectifier circuit 308 can be configured to provide a positive representation of the output of the amplifier and filter circuits 304, 306, and measurement circuits, including a peak and hold circuit (PEAK) 310 and an integrator circuit (INT) 312 can be configured to measure and hold analog measurements indicative of cumulative or peak signal exposure of the analog microphone 301. In certain examples, appropriate op-amp or capacitor and diode-based solutions can be implemented for each of the integrator and peak and hold analog circuits, selecting time periods long enough to provide accurate representations of witnessed values/conditions, while removing or isolating frequency content relevant for digital storage and reproduction. In this example, digital circuitry does not receive a reproducible copy of any analog audio signal, only measurements, such as a local maximum in time or an integral amount of noise over time.

In other examples, the analog processing circuitry can include a portion of those described above, or one or more other circuits in addition to or instead of those described above. For example, although illustrated in FIG. 3 as an A-Weighted Filter, in other examples, the filter circuit 306 can include one or more other filters, such as B, C, or D-Weighted Filter. In other examples, the filter circuit 306 can be excluded entirely. In certain examples, a pre-amplifier or amplifier circuit 304 may also not be necessary. In other examples, the amplifier circuit 304 or filter circuit 306 can implement one or more transfer function corrections or high or low-pass filtering, such as to correct for sensor performance or to provide one or more desired output characteristics, such as with respect to vocal attenuations. In an example, the analog processing circuitry can include an envelope detector circuit, such as instead of the rectifier circuit. In other examples, the measurement circuits can be configured to condition the sensor output without the rectifier circuit or the envelope detector circuit.

In an example, the digital processing circuitry can include one or more analog to digital (ADC) circuits 314, 316 configured to convert the analog measurements of the analog processing circuitry into one or more digital outputs, such as to be provided to controller circuitry (CTRL) 318 (e.g., a processor circuit, a micro-processor, a controller, etc.) for use in one or more monitoring processes or storage in a memory circuit 320. In an example, one or more aspects of the digital processing circuitry, such as the controller circuitry 318, etc., can control one or more settings or parameters (e.g., reset) of one or more aspects or components of the analog signal processing circuitry, such as one or more of the measurement circuits, without having access to the output of the microphone 302, or in certain examples, to the inputs or outputs of the amplifier or filter circuits 304, 306, such as to preserve data privacy of the output of the first sensor by avoiding storage of audible frequencies by digital processing circuitry of the example signal processing system 300.

In an example, processing of the audio signal, such as using the filter or rectifier circuit, can occur substantially in the analog domain, separate from the digital processing circuitry. The processed analog signal can be sampled and stored at relatively low frequency intervals (e.g., 100 Hz, 50 Hz, 20 Hz, etc.) in contrast to the bandwidth of analog sensors. In certain examples, relatively low frequency intervals can include frequencies low enough such that vocal audio processed or stored at such frequency intervals cannot be re-created (e.g., less than 2 kHz, 1 kHz, 100 Hz, 10 Hz, etc.), while high enough to detect and distinguish successive impulse events, such as from rapid fire weapons.

For example, vocal frequency bands for telephony range from approximately 300 to 3400 Hz. In certain examples, the voice frequency range can be considered between 300 and 3000 Hz. Filtering vocal frequencies above 1 kHz can reduce intelligibility of speech by more than 60%. Filtering vocal frequencies above 500 Hz can reduce intelligibility of speech by more than 95%. Lower frequency intervals generally provide higher level of data privacy. To reconstruct a continuous analog signal, sampling at a frequency interval is required at least twice the maximum frequency of the continuous analog signal. Accordingly, directly sampling a vocal audio signal below 6 kHz will lead to some loss of at least some of the original vocal audio signal. Sampling a vocal audio signal below 2 kHz can reduce recreation of the signal by more than 60%, and below 1 kHz by more than 95%. In certain examples, digital processing circuitry, such as an ADC, can sample a vocal audio signal at a low frequency interval with respect to a vocal frequency range, such as lower than 2 kHz, 1 kHz, 500 Hz, 200 Hz, 100 Hz, etc. In general, the lower the sampling frequency, the higher the vocal data security. In contrast, the frequency of successive impulse events, such as from rapid fire weapons, can be as high as or higher than 10 Hz. To detect such events individually, a sampling frequency above 20 Hz, such as 50 Hz or 100 Hz may be desired. Accordingly, in certain examples, a sampling frequency between 50 Hz and 3 kHz, or more specifically, between 100 Hz and 1 kHz, may increase both data privacy and impulse detection integrity.

In other examples, analog circuitry can receive and process the analog audio signal, determine one or more relevant measurements about the analog audio signal, such as an average amplitude with respect to a time interval, an integrated output with respect to a time interval, a peak amplitude level with respect to a time interval, etc. Measurements can be stored at a high enough rate to allow accurate digital calculation of desired noise or blast exposure, such as of a sliding, 8-hour time-weighted average or integrated dose or peak exposure to provide the subject or one or more other persons or systems monitoring the subject with exposure data.

In certain examples, multiple levels of data security can be provided, such as by processing an analog output of sensors to remove changes that can be reproduced into vocal audio signals, and additionally sampling the output of such analog processing at a level below which direct sampling of the audio signal might provide a reproducible vocal input signal.

The flexibility of the proposed sensor and signal processing system allows for integration into a variety of sensor systems, including hearing protection, such as earplugs. A universal foam or flanged push-in earplug with the left and right earpiece labeled is an option. Integration with a restricted fit or custom molded design that only fits either the left or right ear can prevent accidental swapping and ensure binaural data integrity. In an example, the earplugs may require no specialized insertion requirements beyond what is typical for existing HPDs.

In an example, the example signal processing circuitry of FIG. 3 can be used exclusively for the first sensor 105 of FIGS. 1-2. In other examples, the example signal processing circuitry of FIG. 3 can be used for the first and second sensors 105, 112 of FIGS. 1-2, and not the third sensor 115 of FIG. 1, and the third sensor 115 can include a digital sensor with acoustic attenuation without such signal processing circuitry. In another example, the example signal processing circuitry of FIG. 3 can be used for each of the sensors of FIGS. 1-2 including the first, second, and third sensors, 105, 112, 115, where applicable, or the first and third sensors 105, 115 of FIGS. 1-2, etc., for example, depending on the characteristics of each sensor with respect to desired data privacy.

Although illustrated in FIGS. 1-2 as in-ear hearing protection, and described above with respect thereto, in other examples, the internal and external sensors (e.g., the first sensor 105 being an internal sensor and the second and third sensors 112, 115 being external sensors) can be applicable to over-ear or on-ear hearing protection, or more internal and external sensors can be used, such as in case of redundant hearing protection systems having multiple types of hearing protection (e.g., in-ear and over-ear hearing protection, etc.). Hearing protection devices can include proximal and distal portions, proximal with respect to the subject's ear (e.g., open to the subject's ear or inner-ear) while in use, and distal with respect to the external environment (e.g., open with respect to the external environment, opposite a noise barrier of the hearing protection device from the subject's ear or inner-ear).

As described above, information from the different sensors can be used to validate or determine efficacy or compliance of such individual or combination protection devices. For example, measurements internal to a hearing protection device are expected to be lower than external to the hearing protection device by at least a threshold amount, commensurate with the level of protection of the hearing protection device. When multiple or redundant hearing protection systems or devices are used, a stepped reduction in measurements are expected at each level of hearing protection. In an example, in a system having in-ear hearing protection and over-ear hearing protection, measurements external to the in-ear hearing protection are expected to be similar to measurements internal to the over-ear hearing protection. Such redundant systems can be used to calibrate, validate, or determine functionality of one or both devices while in-use.

Figure 4:
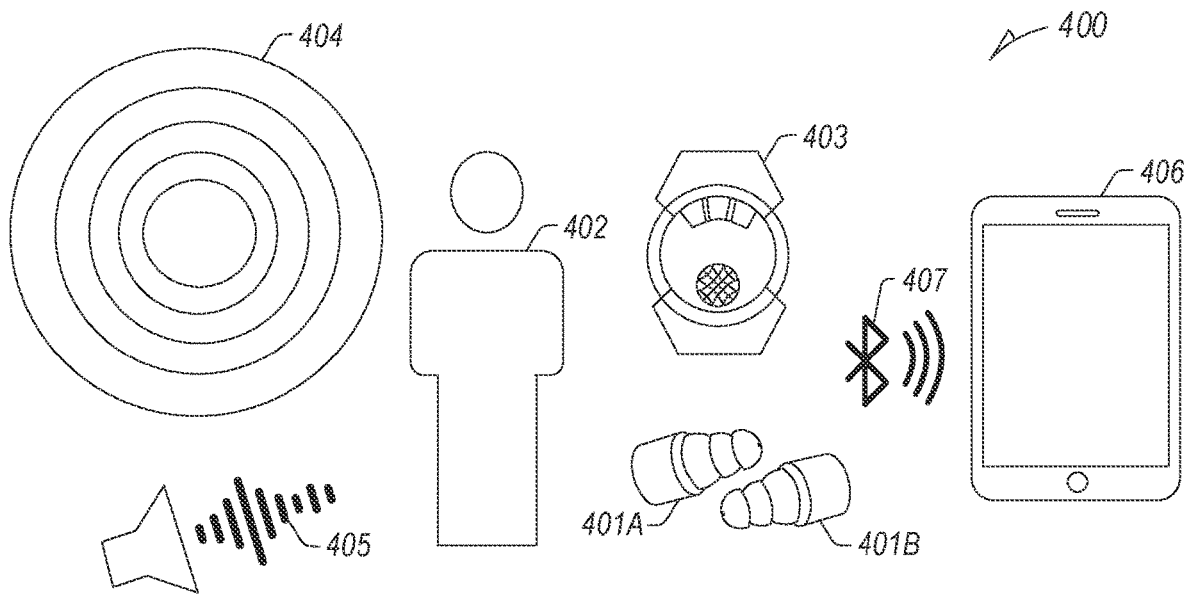
FIG. 4 illustrates an example personal monitoring system including an example earplug noise monitor structures and an ambulatory blast sensors configured to simultaneously monitor blast overpressure (BOP), impulse, and continuous noise exposures.

FIG. 4 illustrates an example personal monitoring system 400 including example earplug noise monitor structures 401A, 401B and an ambulatory blast sensor 403 configured to simultaneously monitor exposure of a subject 402 to blast overpressure (BOP) (e.g., pressures having 1-110 pounds of force per square inch (psi), etc.) or impulse noise exposure 404 (e.g., SPLs between 170-210 dB, etc.), and to continuous noise exposures 405.

In an example, the earplugs can communicate wirelessly with a mobile application 406 (e.g., an Android-based application), accessible via a compatible phone or tablet using standard communication (e.g., Bluetooth) 407. The mobile application 406 can store detailed data for analysis and trending. The mobile application 406 can also alert the subject 402 or one or more other persons or systems monitoring the subject 402 if the subject 402 is exposed to any noise levels that may pose a risk even while using hearing protection. The mobile application 406 may also empower a subject 402 to switch to double HPD when measured exposure is higher than anticipated. In addition to lowering cost by using Commercial Off the Shelf (COTS) hardware, where able, the systems described herein also allows for integration with other wireless blast gauge or other soldier sensor systems. Future integration efforts could leverage the blast gauge sensor platform to monitor environmental noise when double hearing protection is required.

The hardware architecture proposed can be designed for expansion beyond the current proposal to support additional sensors, as the ear offers a tremendously valuable method of affixing other low-powered sensors to the skull of the subject. In particular, the ear is an excellent location for head impact monitoring, thanks to its tight adherence to the skull. In certain examples, the earplug can include an impact sensor or assessment system (e.g., B3 Impact Assessment System, Linx IAS®) to detect, record, and flag hits to the head. Together with a blast monitoring system (e.g., B3 Blast Gauge® System (BGS)), each of these sensors can be fed into a single app, combining blast, noise, and impact monitoring to create a monitor for all major forces that affect the ear and brain. Custom molded ear protectors can also support future physiological sensors, such as monitoring one or more physiologic signals of the subject (e.g., body temperature, heart rate monitoring via PPG or EKG, blood oxygen levels, etc.). The earplugs can also support one or more capacitive touch sensors to minimize the need for subject intervention, which would allow the system to automatically monitor when worn, to receive subject feedback or instruction, mode selection, etc.

Figure 5:
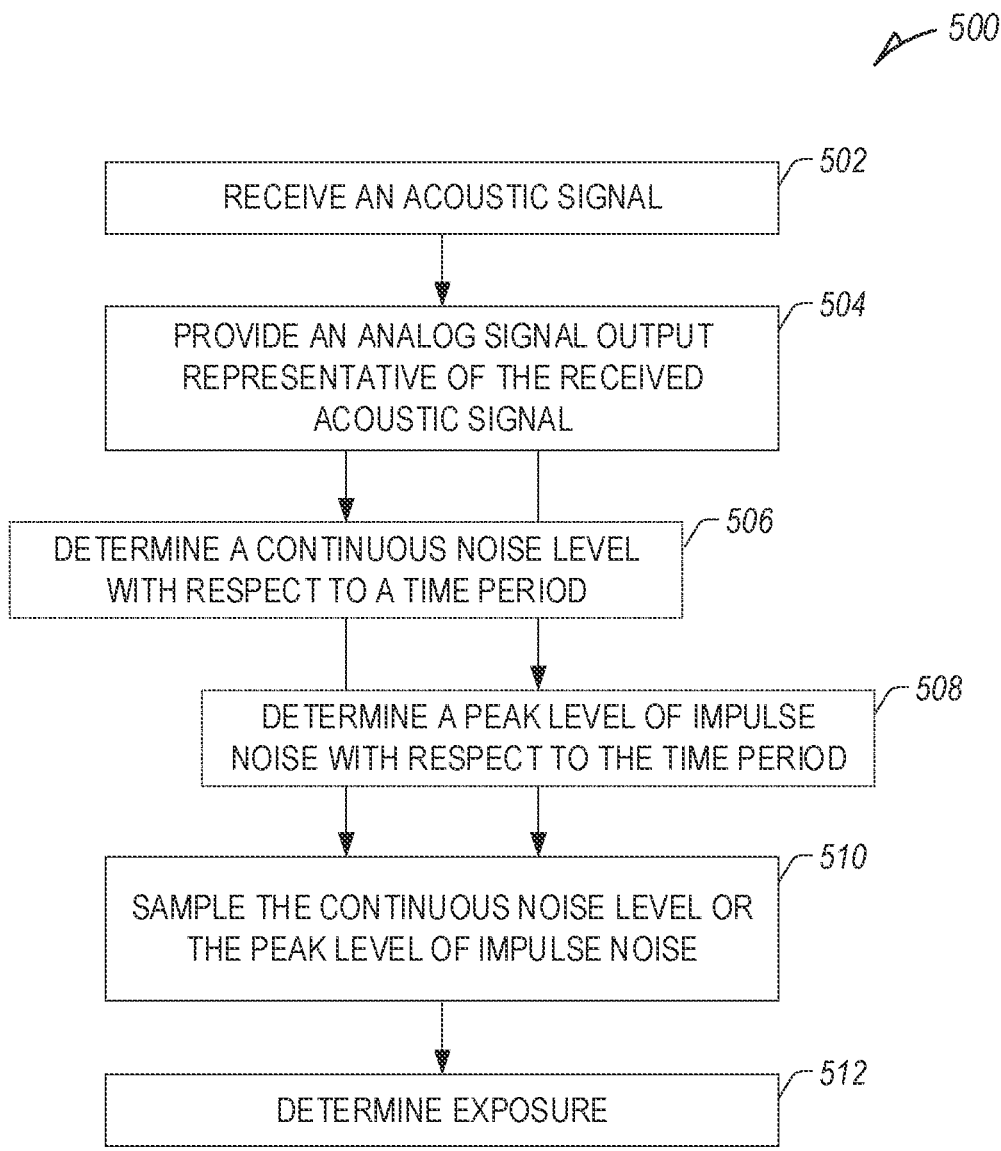
FIG. 5 illustrates an example method to provide acoustic monitoring, such as to determine and monitor exposure to one or more of continuous or peak noise levels over time.

FIG. 5 illustrates an example method 500 to provide acoustic monitoring, such as to determine and monitor exposure to one or more of continuous or peak noise levels over time. At 502, an acoustic signal can be received, such as using a sensor, such as a microphone or one or more other acoustic transducers configured to convert a received acoustic signal (e.g., pressure waves, such as acoustic pressure waves, impulse or blast pressure waves, etc.) into an electrical output signal representative of the received acoustic signal. At 504, an analog signal output representative of the received acoustic signal can be provided, such as using the sensor. In an example, the sensor can include one or more of the first, second, or third sensors illustrated in FIGS. 1-2. One or more analog signal processing steps can be performed on the analog signal output, such as illustrated or discussed m FIG. 3.

In an example, one or more measurements can be performed by analog signal processing circuitry, such as to provide data privacy of the first analog signal output, isolating vocal audio signals from digital sampling and storage. For example, at 506, a continuous noise level of the analog signal output (or resulting signal after analog signal processing) can be determined, such as using an integrator circuit (e.g., an op-amp and capacitor-based integrator circuit, etc.), in certain examples, switched to reset at specific time intervals, such as after sampling by digital signal processing circuitry, etc. In certain examples, the time period for integration can be controlled by the digital signal processing circuitry, such as to coordinate sampling at a known time. At 508, a peak level of impulse noise of the first can be determined, such as using a peak and hold circuit (e.g., a capacitor and diode-based peak and hold circuit, an op-amp and capacitor and diode-based circuit, etc.), in certain examples, switched to reset at the specific time intervals, the same as or different than at 506.

At 510, one or more of the analog signal measurements, such as the continuous noise level or the peak level of impulse noise, can be sampled, such as using one or more components of digital signal processing circuitry (e.g., an analog-to-digital converter (ADC), processing circuitry, memory, etc.). In an example, sampling can be performed at a low frequency level with respect to a vocal acoustic frequency. In certain examples, the first analog signal output can be isolated from the digital signal processing circuitry to provide data privacy.

In an example, one or both of the continuous and peak noise levels can be determined using analog measurement of shorter time periods within a longer extended time period, such as 8, 10, or 12 hours, or one or more daily, weekly, or monthly time periods, etc. Digital sampling of the analog measurements can be performed periodically throughout the extended time period using the digital signal processing circuitry, and such samples can be used to determine exposure levels.

At 512, exposure of a subject can be determined and displayed or provided to the subject or one or more decision-makers, such as to assist placement of soldiers or monitor subject safety. In an example, exposure can be determined using digital samples of one or more sensors across an extended time period, and tracked for a user or group of users. In certain examples, having internal and external-based sensors, such as illustrated in FIGS. 1-2, a difference in sensor measurements between sensors can be used to determine exposure to noise and impulse events, as well as configured to determine hearing protection compliance and safety metrics. For example, if earplug structures are worn properly and at the appropriate times, a large delta is expected between the interior and exterior sensor measurements. Notifications and alerts can be determined to judge efficacy and compliance of hearing protection, as well as subject exposure to noise or impulse events.

Figure 6:
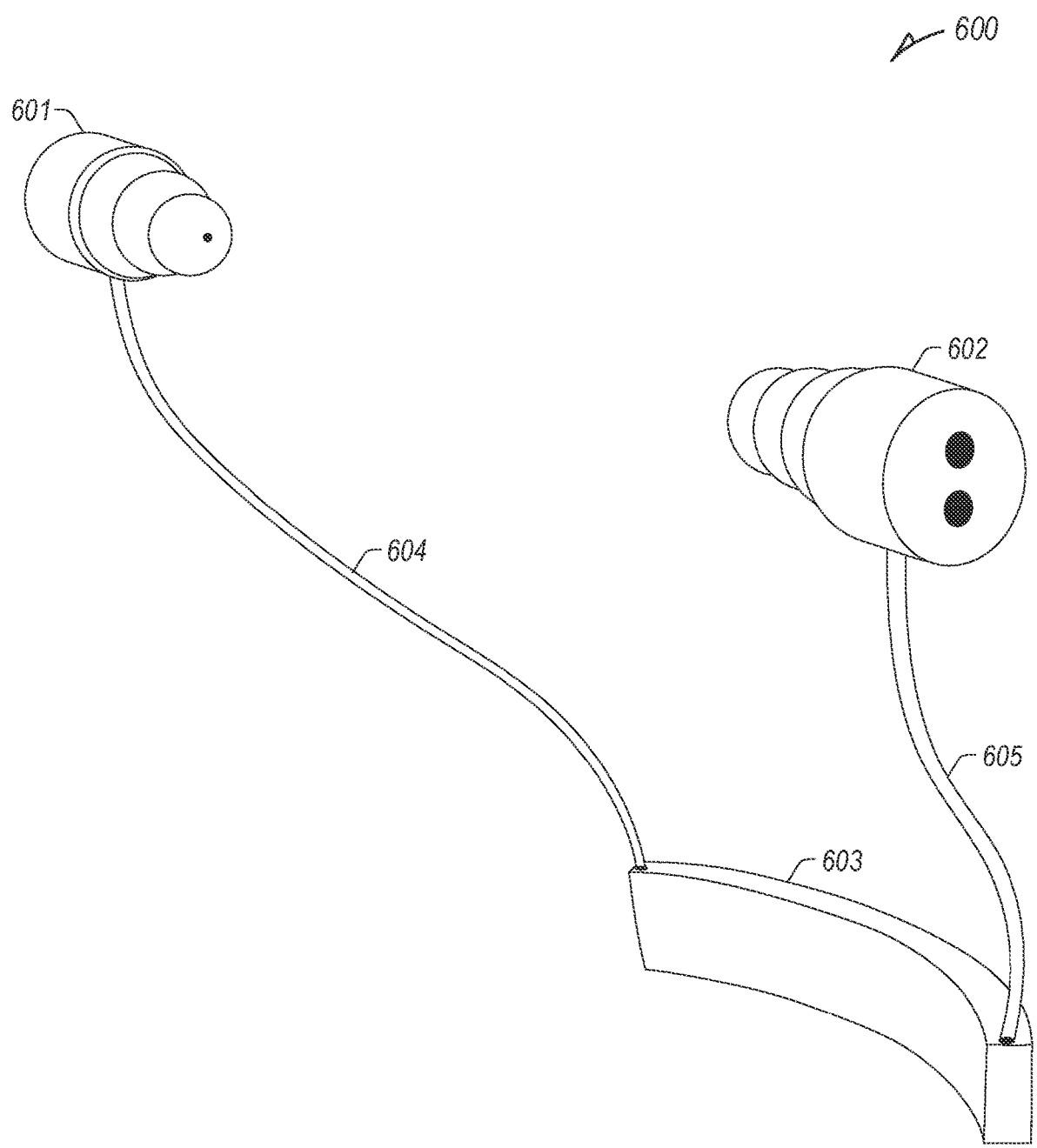
FIG. 6 illustrates an example tethered earplug noise monitor system.

FIG. 6 illustrates an example tethered earplug noise monitor system 600 having components of the wireless earplug structures 100, 200 of FIGS. 1-2, such as first and second wireless earplug structures 601, 602 positioned away from the earplug structures to a tether portion 603 of the tethered earplug noise monitor system 600. In certain examples, earplug noise monitor system 600 can provide additional battery life or processing capabilities, or can relocated a portion of the weight of the wireless earplug structures 100, 200 of FIGS. 1-2 away from the distal portion of each earplug structure 100, 200, and instead to the tether portion 603 of the tethered earplug noise monitor system 600. In other examples, the tether portion 603 can include one or more other tether configurations configured to be located around a head, neck, or shoulder portion of the subject, such as using shorter or longer first and second tethers 604, 605, etc.

Figure 7:
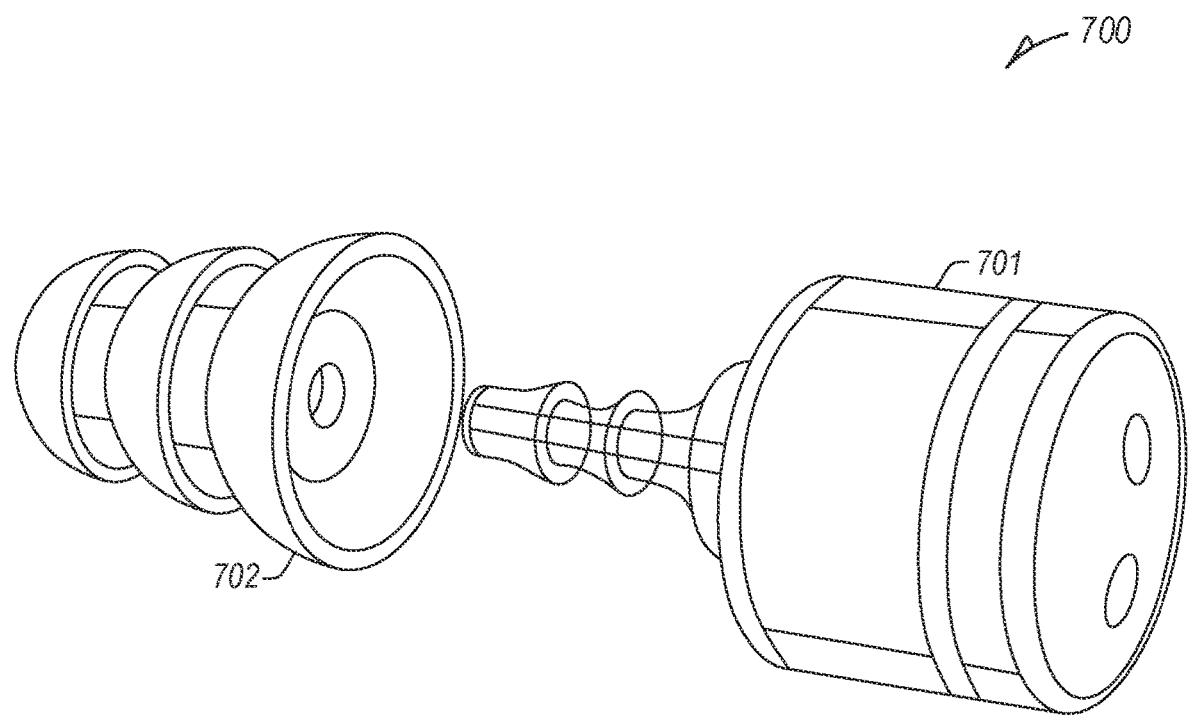
FIG. 7 illustrates an external view of an example wireless earplug structure.

FIG. 7 illustrates an external view of an example wireless earplug structure 700 including a housing 701 and an earplug 702 separate from the sensor portion of the earplug system, such that the sensor portion of the earplug system can be integrated with a universal-type or custom molded hearing protection portion of the earplug 702. In certain examples, custom left and right hearing protection portions can be made, such as to ensure better fit, better sound isolation, adherence, or to ensure data integrity for each ear across multiple uses. The hearing protection portions of the earplug 702 in contact with the ear canal of the subject can also be replaceable, and the sensors and electronics of the housing 701 reusable for the same or different subjects. In an example, one or more openings of the earplug system can integrate an acoustic mesh or vent having minimal impact on sound quality to mitigate moisture/debris ingress into the sensors.

Typical reusable earplug systems are configured for 2-4 weeks of use before replacement, with custom molded hearing protection configured for use up to 5 years or more before replacement. In certain examples, the earplug systems disclosed herein can be configured for 1-5 years of use with intermittent recharge periods.

Figure 8:
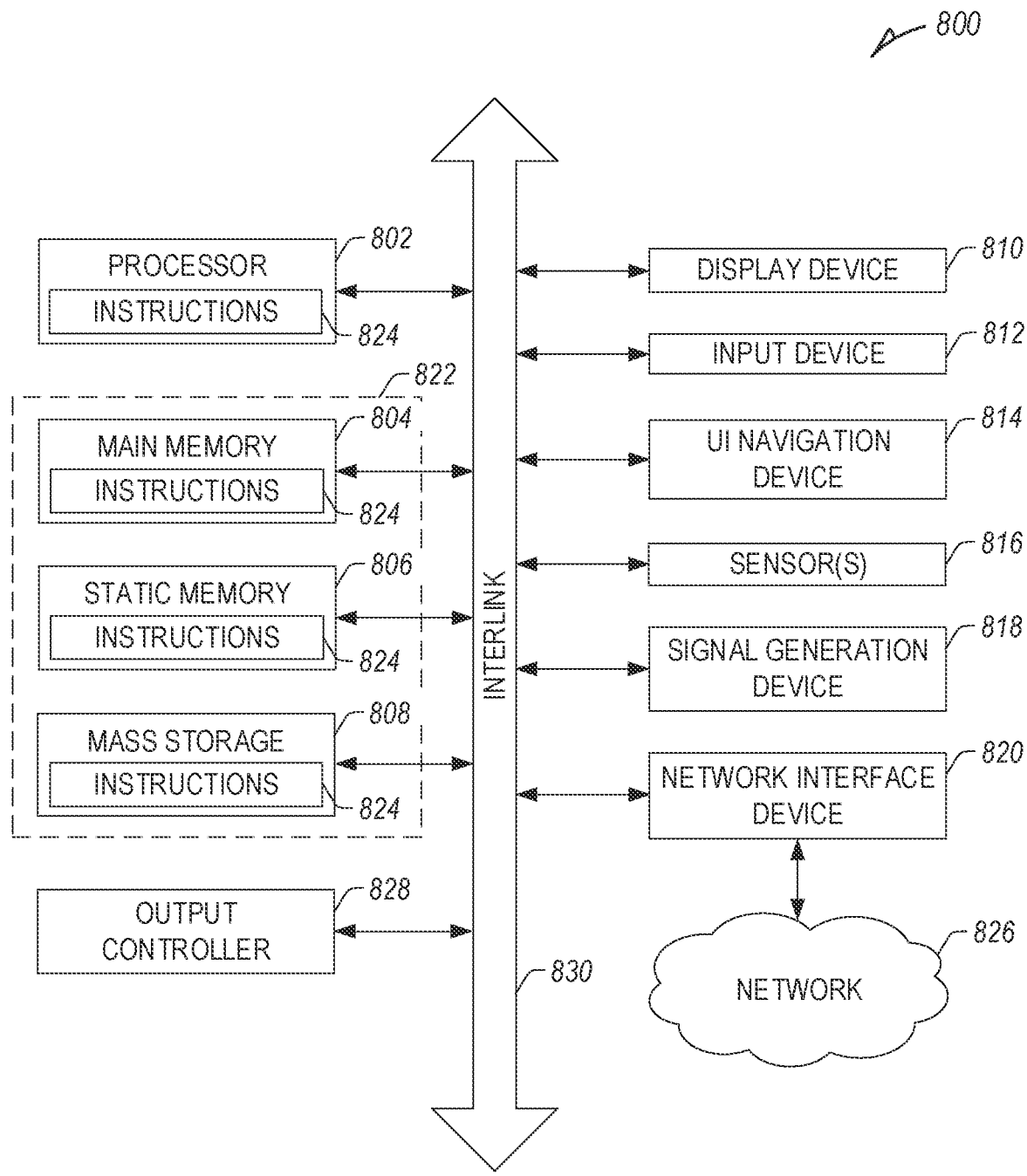
FIG. 8 illustrates a block diagram of an example machine upon which any one or more of the techniques (e.g., methodologies) discussed herein may perform.

FIG. 8 illustrates a block diagram of an example machine 800 upon which any one or more of the techniques (e.g., methodologies) discussed herein may perform. Portions of this description may apply to the computing framework of one or more of the dosimeters, circuits, or processors described herein. Examples, as described herein, may include, or may operate by, logic or a number of components, or mechanisms in the machine 800, Circuitry (e.g., processing circuitry, a dosimeter circuit, etc.) is a collection of circuits implemented in tangible entities of the machine 800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 may include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drive, tape drive, flash storage, or other block devices) some or all of which may communicate with each other via an interlink (e.g., bus) 830. The machine 800 may further include a display unit 810, an alphanumeric input device 812 (e.g., a keyboard), and a user interface (UI) navigation device 814 (e.g., a mouse). In an example, the display unit 810, input device 812, and UI navigation device 814 may be a touch screen display. The machine 800 may additionally include a signal generation device 818 (e.g., a speaker), a network interface device 820, and one or more sensors 816, such as a global positioning system (IPS) sensor, compass, accelerometer, or one or more other sensors. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 may be, or include, a machine-readable medium 822 on which is stored one or more sets of data structures or instructions 824 (e.g., software) embodying or utilized by any one or more of the techniques or functions described herein. The instructions 824 may also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 may constitute the machine-readable medium 822. While the machine-readable medium 822 is illustrated as a single medium, the term "machine-readable medium" may include a single medium or multiple media (e.g., a centralized or distributed database, and/or associated caches and servers) configured to store the one or more instructions 824.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine-readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800, and includes digital or analog communications signals or other intangible medium to facilitate communication of such software. A transmission medium is a machine-readable medium.

Various embodiments are illustrated in the figures described above. One or more features from one or more of these embodiments may be combined to form other embodiments. Method examples described herein can be machine or computer-implemented at least in part. Some examples may include a computer-readable medium or machine-readable medium encoded with instructions operable to configure an electronic device or system to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile computer-readable media during execution or at other times.

Example 1 is an acoustic monitoring system, comprising: a first sensor configured to receive a first acoustic signal and provide a first analog signal output representative of the received first acoustic signal, analog signal processing circuitry configured to receive the first analog signal output of the first sensor and to determine at least one of a continuous noise level of the first analog signal output or a peak level of impulse noise of the first analog signal output; and digital signal processing circuitry configured to receive and sample at least one of the determined continuous noise level of the first analog signal output or the peak level of impulse noise of the first analog signal output from the analog signal processing circuitry to provide data privacy of the first analog signal output.

In Example 2, the subject matter of Example 1 includes, wherein the digital signal processing circuitry is configured to receive and sample the determined continuous noise level and the peak level of impulse noise from the analog signal processing circuitry, and wherein the digital signal processing circuitry does not receive and sample the first analog signal output from the first sensor.

In Example 3, the subject matter of Examples 1-2 includes, wherein the digital signal processing circuitry is configured to sample at least one of the determined continuous noise level or the peak level of impulse noise from the analog signal processing circuitry at a low frequency level with respect to a vocal acoustic frequency to provide data privacy of the first analog signal output.

In Example 4, the subject matter of Example 3 includes, wherein the low frequency level is less than 3 kHz.

In Example 5, the subject matter of Example 4 includes, wherein the low frequency level is less than 1 kHz and greater than 100 Hz.

In Example 6, the subject matter of Examples 1-5 includes, wherein the digital signal processing circuitry comprises: an analog-to-digital converter (ADC) configured to receive and sample at least one of the determined continuous noise level or the peak level of impulse noise from the analog signal processing circuitry; a control circuit configured to control at least one of the ADC or the analog signal processing circuitry; and a memory circuit configured to store information from the ADC, wherein the digital signal processing circuitry does not have access to the first analog signal output of the first sensor or audible frequencies of the received first acoustic signal.

In Example 7, the subject matter of Examples 1-6 includes, wherein the analog signal processing circuitry comprises at least one of: an analog peak and hold circuit configured to determine the peak level of impulse noise of the first analog signal output with respect to a time period; or an integrator circuit configured to determine the continuous noise level of the first analog signal output with respect to a time period, wherein the analog signal processing circuitry is configured to determine at least one of the continuous noise level of the first analog signal output with respect to the time period or the peak level of impulse noise of the first analog signal output with respect to the time period to separate the continuous noise level of the first analog signal output or the peak level of impulse noise of the first analog signal output from audible frequency information of the received acoustic noise such that vocal audio content of the first analog signal output of the first sensor cannot be re-created by, the digital signal processing circuitry.

In Example 8, the subject matter of Examples 1-7 includes, a first hearing protection device configured to provide at least one of continuous or impulse noise dosimetry, comprising: a proximal portion configured for placement in, on, or over an ear of a subject to at least partially reduce exposure of an inner ear of the subject to external noise, the proximal portion including the first sensor and, when in use, at least partially isolated from an external environment; and a distal portion configured to be located distal to the ear of the subject with respect to the proximal portion and, when in use, exposed to the external environment.

In Example 9; the subject matter of Example 8 includes, wherein the first hearing protection device includes a first in-ear hearing protection device configured to provide the at least one of continuous or impulse noise dosimetry, wherein the proximal portion is configured for placement in an ear canal of the subject to at least partially reduce exposure of the inner ear of the subject to external noise, the proximal portion comprising a first opening at a first end, wherein the distal portion is configured to be located outside of the ear canal of the subject, and wherein the first sensor includes a sound port open to the first opening configured to receive the first acoustic signal with respect to the first opening.

In Example 10, the subject matter of Example 9 includes, wherein the proximal portion comprises an air duct open to the first opening, wherein the first sensor comprises a sound port open to the air duct, wherein the distal portion comprises a second opening on a second end opposite the first end, a battery, a communication circuit, the analog and digital signal processing circuitry, and a second sensor having a sound port open to the second opening, wherein the distal portion is coupled to the proximal portion using an isolating structure configured to attenuate physical shock from the distal portion to the proximal portion, wherein the second sensor is configured to receive a second acoustic signal and provide a second analog signal output representative of the received second acoustic signal, wherein the analog signal processing circuitry is configured to receive the second analog signal output of the second sensor and to determine at least one of a continuous noise level of the second analog signal output with respect to a time period or a peak level of impulse noise of the second analog signal output with respect to a time period, and wherein the digital signal processing circuitry is configured to receive and sample at least one of the determined continuous noise level of the second analog signal output or the peak level of impulse noise of the second analog signal output from the analog signal processing circuitry to provide data privacy of the second analog signal output.

In Example 11, the subject matter of Example 10 includes, wherein the first sensor is configured to receive the first acoustic signal internal to the air duct of the proximal portion of the first in-ear hearing protection device, and wherein the second sensor is configured to receive the second acoustic signal external to the first in-ear hearing protection device.

In Example 12, the subject matter of Example 11 includes, Wherein the second sensor is configured to provide the second analog signal output representative of the received second acoustic signal including sound pressure levels (SPL) up to an upper limit of the second sensor, wherein the distal portion comprises a third opening on the second end and a third sensor having a sound port open to the third opening, and wherein the third sensor is configured to receive a third acoustic signal external to the first in-ear hearing protection device and to provide a third analog signal output representative of the received third acoustic signal, including impulse noise levels having sound pressure levels above the upper limit of the second sensor, including above 140 dB.

In Example 13, the subject matter of Example 12 includes, wherein the proximal portion is separated from the first sensor using a vibration dampening material, and wherein the isolating structure comprises a flexible, s-shaped structure.

Example 14 is a method comprising: receiving, using a first sensor, a first acoustic signal and providing a first analog signal output representative of the received first acoustic signal; determining, using analog signal processing circuitry, at least one of a continuous noise level of the first analog signal output of the first sensor or a peak level of impulse noise of the first analog signal output of the first sensor; and sampling, using digital signal processing circuitry, at least one of the determined continuous noise level of the first analog signal output or the peak level of impulse noise of the first analog signal output from the analog signal processing circuitry to provide data privacy of the first analog signal output.

In Example 15, the subject matter of Example 14 includes, Wherein sampling at least one of the determined continuous noise level or the peak level of impulse noise from the analog signal processing circuitry comprises sampling the determined continuous noise level and the peak level of impulse noise using the digital signal processing circuitry at a low frequency level with respect to a vocal acoustic frequency and not sampling the first analog signal output from the first sensor using the digital signal processing circuitry.

In Example 16, the subject matter of Example 15 includes, wherein the low frequency level is less than 3 kHz.

In Example 17, the subject matter of Examples 14-16 includes, wherein sampling at least one of the determined continuous noise level of the first analog signal output or the peak level of impulse noise of the first analog signal output from the analog signal processing circuitry using the digital signal processing circuitry comprises: receiving and sampling at least one of the determined continuous noise level or the peak level of impulse noise from the analog signal processing circuitry using an analog-to-digital converter (ADC); controlling at least one of the ADC or the analog signal processing circuitry using a control circuit; and storing information from the ADC using a memory circuit, wherein the digital signal processing circuitry does not have access to the first analog signal output of the first sensor or audible frequencies of the received first acoustic signal, wherein determining at least one of the continuous noise level of the first analog signal output or the peak level of impulse noise of the first analog signal output comprises to separate the continuous noise level of the first analog signal output or the peak level of impulse noise of the first analog signal output from the audible frequency information of the received acoustic noise such that vocal audio content of the first analog signal output of the first sensor cannot be re-created by the digital signal processing circuitry, wherein determining the continuous noise level of the first analog signal output of the first sensor comprises using an analog peak-and-hold circuit, and Wherein determining the peak level of impulse noise of the first analog signal output of the first sensor comprises using an integrator circuit.

In Example 18, the subject matter of Examples 14-17 includes, providing at least one of continuous or impulse noise dosimetry using a first hearing protection device comprising: a proximal portion configured for placement in, on, or over an ear of a subject to at least partially reduce exposure of an inner ear of the subject to external noise, the proximal portion including the first sensor and, when in use, at least partially isolated from an external environment; and a distal portion configured to be located distal to the ear of the subject with respect to the proximal portion and, when in use, exposed to the external environment.

In Example 19, the subject matter of Example 18 includes, wherein providing the at least one of continuous or impulse noise dosimetry using the first hearing protection device comprises using a first in-ear hearing protection device, wherein the proximate portion is configured for placement in an ear canal of the subject to at least partially reduce exposure of the inner ear of the subject to external noise, the proximal portion comprising a first opening at a first end, wherein the distal portion is configured to be located outside of the ear canal of the subject, wherein the method further comprises: attenuating physical shock from the distal portion of the first in-ear hearing protection device to the proximal portion of the first in-ear hearing protection device using an isolating structure; and receiving, using a second sensor, a second acoustic signal external to the first in-ear hearing protection device and providing a second analog signal output representative of the received second acoustic signal by the second sensor, wherein receiving the first acoustic signal using the first sensor includes using receiving the first acoustic signal internal to the proximal portion of the first in-ear hearing protection device using a sound port open to the first opening.

In Example 20, the subject matter of Example 19 includes, wherein receiving the second acoustic signal using the second sensor includes receiving sound pressure levels (SPL) up to an upper limit of the second sensor, wherein the isolating structure comprises a flexible, s-shaped structure, and wherein the method further comprises: receiving, using a third sensor, a third acoustic signal external to the first in-ear hearing protection device and providing a third analog signal output representative of the received third acoustic signal by the third sensor, including impulse noise levels having sound pressure levels above the upper limit of the second sensor, including above 140 dB.

Example 21 is an in-ear acoustic monitoring system, comprising: a first in-ear hearing protection device configured to provide continuous and impulse noise dosimetry, comprising: a proximal portion configured for placement in an ear canal of a subject to at least partially reduce exposure of an inner ear of the subject to external noise, the proximal portion comprising a first opening at a first end and an air duct open to the first opening; a first sensor having a sound port open to the air duct of the proximal portion; a distal portion configured to be located outside of the ear canal of the subject, the distal portion comprising a second opening on a second end opposite the first end, a second sensor having a sound port open to the second opening, a battery, a communication circuit, and analog and digital signal processing circuitry; and an isolating structure configured to couple the distal portion to the proximal portion.

In Example 22, the subject matter of Example 21 includes, wherein the first sensor is configured to measure continuous noise internal to the air duct of the proximal portion of the first in-ear hearing protection device, and wherein the second sensor is configured to measure continuous external noise level outside of the first in-ear hearing protection device.

In Example 23, the subject matter of Example 22 includes, wherein the second sensor is configured to measure continuous external noise level outside of the first in-ear hearing protection device, including sound pressure levels up to an upper limit of the second sensor, wherein the upper limit is approximately 140 dB SPL.

In Example 24, the subject matter of Examples 21-23 includes, wherein the distal portion comprises second and third exterior openings on the second end and a third sensor having a sound port open to the third opening, wherein the second sensor is configured to measure continuous external noise level outside of the first in-ear hearing protection device, including sound pressure levels up to an upper limit of the second sensor, wherein the upper limit is approximately 140 dB SPL, and wherein the third sensor is configured to measure impulse noise level outside of the first in-ear hearing protection device, including sound pressure levels above the upper limit of the second sensor.

In Example 25, the subject matter of Examples 21-24 includes, wherein the first in-ear hearing protection device comprises: a vibration dampening material between the proximal portion and the first sensor; and wherein the isolating structure comprises a flexible, vinyl, s-shaped structure; wherein the first sensor is configured to measure continuous noise internal to the air duct of the proximal portion of the first in-ear hearing protection device, Wherein the second sensor is configured to measure continuous external noise level outside of the first in-ear hearing protection device, including sound pressure levels up to an upper limit of the second sensor, Wherein the upper limit is approximately 140 dB SPL wherein the third sensor is configured to measure impulse noise level outside of the first in-ear hearing protection device, including sound pressure levels above the upper limit of the second sensor.

Example 26 is an in-ear acoustic monitoring system, comprising: first and second in-ear hearing protection devices configured to provide continuous and impulse noise dosimetry in respective first and second ears of a subject, each hearing protection device comprising: a proximal portion configured for placement in an ear canal of a subject to at least partially reduce exposure of an inner ear of the subject to external noise, the proximal portion comprising a first opening at a first end and an air duct opened to the first opening; a first sensor having a sound port open to with the air duct of the proximal portion; a vibration dampening material between the proximal portion and the first sensor; and a distal portion configured to be located outside of the ear canal of the subject, the distal portion comprising a second and third opening on a second end opposite the first end, a second sensor having a sound port, open to the second opening, a third sensor having a sound port open to the third opening, a battery, a communication circuit, and analog and digital signal processing circuitry; and an isolating structure configured to couple the distal portion to the proximal portion, Wherein the isolating structure comprises a flexible, vinyl, s-shaped structure, wherein the first sensor is configured to measure continuous noise internal to the air duct of the proximal portion of the first in-ear hearing protection device, wherein the second sensor is configured to measure continuous external noise level outside of the first in-ear hearing protection device, including sound pressure levels up to an upper limit of the second sensor, wherein the upper limit is approximately 140 dB SPL, and wherein the third sensor is configured to measure impulse noise level outside of the first in-ear hearing protection device, including sound pressure levels above the upper limit of the second sensor.

Example 27 is an in-ear acoustic monitoring system, comprising: a first in-ear hearing protection device configured to provide continuous and impulse noise dosimetry, comprising: a proximal portion configured for placement in an ear canal of a subject to at least partially reduce exposure of an inner ear of the subject to external noise, the proximal portion comprising a first opening at a first end; a first sensor having a sound port open to the first opening configured to receive noise with respect to the first opening and provide a first analog signal output representative of the received noise, a distal portion configured to be located outside of the ear canal of the subject, the distal portion comprising a battery, a communication circuit, and analog and digital signal processing circuitry; and wherein the analog signal processing circuitry is configured to receive the first analog signal output of the first sensor, to determine at least one of a continuous noise level of the first analog signal output with respect to a time period or a peak level of impulse noise of the first analog signal output with respect to the time period, and wherein the digital signal processing circuitry is configured to receive and store at least one of the determined continuous noise level or the peak level of impulse noise from the analog signal processing circuitry.

In Example 28, the subject matter of Example 27 includes, wherein the digital signal processing circuitry is configured to sample at least one of the determined continuous noise level or the peak level of impulse noise from the analog signal processing circuitry at a low frequency level to preserve data privacy of the first analog signal output.

In Example 29, the subject matter of Example 28 includes, wherein the low frequency level is less than at least one of 3 kHz, 1 kHz, 100 Hz, or 10 Hz, wherein lower frequencies provide a higher level of data privacy with respect to the first analog signal output.

In Example 30, the subject matter of Examples 27-29 includes, wherein the digital signal processing circuitry does not have access to the first analog signal output of the first sensor or audible frequencies received by the first sensor, and wherein the analog signal processing circuitry is configured to determine the continuous noise level of the first analog signal output with respect to the time period and the peak level of impulse noise of the first analog signal output with respect to the time period, such that the first analog signal output of the first sensor cannot be re-created by the digital signal processing circuitry.

In Example 31, the subject matter of Examples 27-30 includes, wherein the first in-ear hearing protection device comprises: a second opening on a second end of the distal portion opposite the first end of the proximal portion; a second sensor having a sound port open to the second opening; and an isolating structure configured to couple the distal portion to the proximal portion.

Example 32 is at least one machine-readable medium including instructions that, when executed by processing circuitry, cause the processing circuitry to perform operations to implement of any of Examples 1-31.

Example 33 is an apparatus comprising means to implement of any of Examples 1-31.

Example 34 is a system to implement of any of Examples 1-31.

Example 35 is a method to implement of any of Examples 1-31.

The above detailed description is intended to be illustrative, and not restrictive. The scope of the disclosure should, therefore, be determined with references to the appended claims, along with the full scope of equivalents to which such claims are entitled.

What is claimed is:

1. An acoustic monitoring system, comprising:
a first sensor configured to receive a first acoustic signal and provide a first analog signal output representative of the received first acoustic signal,
analog signal processing circuitry configured to receive the first analog signal output of the first sensor and to determine at least one of a continuous noise level of the first analog signal output or a peak level of impulse noise of the first analog signal output; and
digital signal processing circuitry configured to receive and sample at least one of the determined continuous noise level of the first analog signal output or the peak level of impulse noise of the first analog signal output from the analog signal processing circuitry to provide data privacy of the first analog signal output.

2. The acoustic monitoring system of claim 1, wherein the digital signal processing circuitry is configured to receive and sample the determined continuous noise level and the peak level of impulse noise from the analog signal processing circuitry, and
wherein the digital signal processing circuitry does not receive and sample the first analog signal output from the first sensor.

3. The acoustic monitoring system of claim 1, wherein the digital signal processing circuitry is configured to sample at least one of the determined continuous noise level or the peak level of impulse noise from the analog signal processing circuitry at a low frequency level with respect to a vocal acoustic frequency to provide data privacy of the first analog signal output.

4. The acoustic monitoring system of claim 3, wherein the low frequency level is less than 2 kHz.

5. The acoustic monitoring system of claim 4, wherein the low frequency level is less than 1 kHz and greater than 100 Hz.

6. The acoustic monitoring system of claim 1, wherein the digital signal processing circuitry comprises:
an analog-to-digital converter (ADC) configured to receive and sample at least one of the determined continuous noise level or the peak level of impulse noise from the analog signal processing circuitry;
a control circuit configured to control at least one of the ADC or the analog signal processing circuitry; and
a memory circuit configured to store information from the ADC,
wherein the digital signal processing circuitry does not have access to audible frequencies of the received first acoustic signal.

7. The acoustic monitoring system of claim 1, wherein the analog signal processing circuitry comprises at least one of:
an analog peak and hold circuit configured to determine the peak level of impulse noise of the first analog signal output with respect to a time period; or
an integrator circuit configured to determine the continuous noise level of the first analog signal output with respect to a time period,
wherein the analog signal processing circuitry is configured to determine at least one of the continuous noise level of the first analog signal output with respect to the time period or the peak level of impulse noise of the first analog signal output with respect to the time period to separate the continuous noise level of the first analog signal output or the peak level of impulse noise of the first analog signal output from audible frequency information of the received acoustic noise such that vocal audio content of the first analog signal output of the first sensor cannot be re-created by the digital signal processing circuitry.

8. The acoustic monitoring system of claim 1, comprising:
a first hearing protection device configured to provide at least one of continuous or impulse noise dosimetry, comprising:
a proximal portion configured for placement in, on, or over an ear of a subject to at least partially reduce exposure of an inner ear of the subject to external noise, the proximal portion including the first sensor and, when in use, at least partially isolated from an external environment; and a distal portion configured to be located distal to the ear of the subject with respect to the proximal portion and, when in use, exposed to the external environment.

9. The acoustic monitoring system of claim 8, wherein the first hearing protection device includes a first in-ear hearing protection device configured to provide the at least one of continuous or impulse noise dosimetry, wherein the proximal portion is configured for placement in an ear canal of the subject to at least partially reduce exposure of the inner ear of the subject to external noise, the proximal portion comprising a first opening at a first end, wherein the distal portion is configured to be located outside of the ear canal of the subject, and wherein the first sensor includes a sound port open to the first opening configured to receive the first acoustic signal with respect to the first opening.

10. The acoustic monitoring system of claim 9, wherein the proximal portion comprises an air duct open to the first opening, wherein the first sensor comprises a sound port open to the air duct, wherein the distal portion comprises a second opening on a second end opposite the first end, a battery, a communication circuit, the analog and digital signal processing circuitry, and a second sensor having a sound port open to the second opening, wherein the distal portion is coupled to the proximal portion using an isolating structure configured to attenuate physical shock from the distal portion to the proximal portion, wherein the second sensor is configured to receive a second acoustic signal and provide a second analog signal output representative of the received second acoustic signal, wherein the analog signal processing circuitry is configured to receive the second analog signal output of the second sensor and to determine at least one of a continuous noise level of the second analog signal output with respect to a time period or a peak level of impulse noise of the second analog signal output with respect to a time period, and wherein the digital signal processing circuitry is configured to receive and sample at least one of the determined continuous noise level of the second analog signal output or the peak level of impulse noise of the second analog signal output from the analog signal processing circuitry to provide data privacy of the second analog signal output.

11. The acoustic monitoring system of claim 10, wherein the first sensor is configured to receive the first acoustic signal internal to the air duct of the proximal portion of the first in-ear hearing protection device, and wherein the second sensor is configured to receive the second acoustic signal external to the first in-ear hearing protection device.

12. The acoustic monitoring system of claim 11, wherein the second sensor is configured to provide the second analog signal output representative of the received second acoustic signal including sound pressure levels (SPL) up to an upper limit of the second sensor, wherein the distal portion comprises a third opening on the second end and a third sensor having a sound port open to the third opening, and wherein the third sensor is configured to receive a third acoustic signal external to the first in-ear hearing protection device and to provide a third analog signal output representative of the received third acoustic signal, including impulse noise levels having sound pressure levels above the upper limit of the second sensor, including above 140 dB.

13. The system of claim 12, wherein the proximal portion is separated from the first sensor using a vibration dampening material, and wherein the isolating structure comprises a flexible, s-shaped structure.

14. A method comprising:

receiving, using a first sensor, a first acoustic signal and providing a first analog signal output representative of the received first acoustic signal;

determining, using analog signal processing circuitry, at least one of a continuous noise level of the first analog signal output of the first sensor or a peak level of impulse noise of the first analog signal output of the first sensor; and sampling, using digital signal processing circuitry, at least one of the determined continuous noise level of the first analog signal output or the peak level of impulse noise of the first analog signal output from the analog signal processing circuitry to provide data privacy of the first analog signal output.

15. The method of claim 14, wherein sampling at least one of the determined continuous noise level or the peak level of impulse noise from the analog signal processing circuitry comprises sampling the determined continuous noise level and the peak level of impulse noise using the digital signal processing circuitry at a low frequency level with respect to a vocal acoustic frequency and not sampling the first analog signal output from the first sensor using the digital signal processing circuitry.

16. The method of claim 15, wherein the low frequency level is less than 3 kHz.

17. The method of claim 14, wherein sampling at least one of the determined continuous noise level of the first analog signal output or the peak level of impulse noise of the first analog signal output from the analog signal processing circuitry using the digital signal processing circuitry comprises:

receiving and sampling at least one of the determined continuous noise level or the peak level of impulse noise from the analog signal processing circuitry using an analog-to-digital converter (ADC);

controlling at least one of the ADC or the analog signal processing circuitry using a control circuit; and storing information from the ADC using a memory circuit, wherein the digital signal processing circuitry does not have access to audible frequencies of the received first acoustic signal, wherein determining at least one of the continuous noise level of the first analog signal output or the peak level of impulse noise of the first analog signal output comprises to separate the continuous noise level of the first analog signal output or the peak level of impulse noise of the first analog signal output from the audible frequency information of the received acoustic noise such that vocal audio content of the first analog signal output of the first sensor cannot be re-created by the digital signal processing circuitry, wherein determining the continuous noise level of the first analog signal output of the first sensor comprises using an analog peak-and-hold circuit, and wherein determining the peak level of impulse noise of the first analog signal output of the first sensor comprises using an integrator circuit.

18. The method of claim 14, comprising:
providing at least one of continuous or impulse noise dosimetry using a first hearing protection device comprising:
a proximal portion configured for placement in, on, or over an ear of a subject to at least partially reduce exposure of an inner ear of the subject to external noise, the proximal portion including the first sensor and, when in use, at least partially isolated from an external environment; and
a distal portion configured to be located distal to the ear of the subject with respect to the proximal portion and, when in use, exposed to the external environment.

19. The method of claim 18, wherein providing the at least one of continuous or impulse noise dosimetry using the first hearing protection device comprises using a first in-ear hearing protection device,
wherein the proximate portion is configured for placement in an ear canal of the subject to at least partially reduce exposure of the inner ear of the subject to external noise, the proximal portion comprising a first opening at a first end,
wherein the distal portion is configured to be located outside of the ear canal of the subject,
wherein the method further comprises:
attenuating physical shock from the distal portion of the first in-ear hearing protection device to the proximal portion of the first in-ear hearing protection device using an isolating structure; and
receiving, using a second sensor, a second acoustic signal external to the first in-ear hearing protection device and providing a second analog signal output representative of the received second acoustic signal by the second sensor,
wherein receiving the first acoustic signal using the first sensor includes using receiving the first acoustic signal internal to the proximal portion of the first in-ear hearing protection device using a sound port open to the first opening.

20. The method of claim 19, wherein receiving the second acoustic signal using the second sensor includes receiving sound pressure levels (SPL) up to an upper limit of the second sensor,
wherein the isolating structure comprises a flexible, s-shaped structure, and
wherein the method further comprises:
receiving, using a third sensor, a third acoustic signal external to the first in-ear hearing protection device and providing a third analog signal output representative of the received third acoustic signal by the third sensor, including impulse noise levels having sound pressure levels above the upper limit of the second sensor, including above 140 dB.

\* \* \* \* \*